United States Patent
Göransson et al.

(10) Patent No.: US 8,275,385 B2
(45) Date of Patent: Sep. 25, 2012

(54) METHOD AND ARRANGEMENT FOR ALLOCATING RADIO RESOURCES IN A COMMUNICATION SYSTEM

(75) Inventors: Bo Göransson, Sollentuna (SE); Stephen Grant, Cary, NC (US); George Jöngren, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 517 days.

(21) Appl. No.: 12/443,719

(22) PCT Filed: Oct. 9, 2007

(86) PCT No.: PCT/SE2007/050724
§ 371 (c)(1),
(2), (4) Date: Mar. 31, 2009

(87) PCT Pub. No.: WO2008/051153
PCT Pub. Date: May 2, 2008

(65) Prior Publication Data
US 2010/0015988 A1    Jan. 21, 2010

(30) Foreign Application Priority Data
Oct. 27, 2006   (SE) ........................................ 0602269

(51) Int. Cl.
*H04W 72/00* (2009.01)
(52) U.S. Cl. ................... 455/452.2; 455/452.1
(58) Field of Classification Search ............... 455/452.1, 455/452.2
See application file for complete search history.

(56) References Cited

U.S. PATENT DOCUMENTS

| | | | |
|---|---|---|---|
| 7,986,972 B2 * | 7/2011 | Kim et al. | 455/562.1 |
| 2007/0259671 A1 | 11/2007 | Cheng et al. | |
| 2007/0260956 A1 * | 11/2007 | Terry et al. | 714/748 |

FOREIGN PATENT DOCUMENTS

| | | |
|---|---|---|
| EP | 1432262 A1 | 6/2004 |
| WO | 2005072073 A2 | 8/2005 |
| WO | 2007/088468 A2 | 8/2007 |
| WO | 2008/021188 A2 | 2/2008 |
| WO | 2008/024321 A2 | 2/2008 |

OTHER PUBLICATIONS

3rd Generation Partnership Project, "Baseline uplink E-CQI message—content and size." Huawei. R1-062492. TSG RAN WG1 RAN1 Meeting #46bis, Seoul, Korea, Oct. 9-13, 2006.
3rd Generation Partnership Project, "Discussion on MIMO Feedback." Panasonic. R1-062178. 3GPP TSG RAN WG1 Meeting #46, Tallinn, Estonia, Aug. 28-Sep. 1, 2006.
3RD Generation Partnership Project, "Analysis of Support Channel Overhead for DL MIMO." QUALCOMM Europe. R1-062701. TSG RAN WG1 Meeting #46bis, Seoul, Korea, Oct. 9-13, 2006.
Office Action, international application No. JP 2009-0534544. Date of mailing: Jun. 13, 2012. Japan Patent Office.

* cited by examiner

*Primary Examiner* — Dwayne Bost
*Assistant Examiner* — Larry Sternbane
(74) *Attorney, Agent, or Firm* — Coats & Bennett, P.L.L.C.

(57) ABSTRACT

The present invention relates to a method and an arrangement of facilitating the allocation of radio resources in a communication network, comprising a communication network node (15) communicating with said user equipment (18) by means of data streams over a radio interface on radio channels. A channel quality message having a length of a predefined number of bits is provided comprising information which is used for comparing an obtained channel quality if a single data stream transmission is selected or if a multi data stream transmission is selected for said communication. The available radio resources are then allocated based on said channel quality message.

16 Claims, 4 Drawing Sheets

METHOD AND ARRANGEMENT FOR ALLOCATING RADIO RESOURCES IN A COMMUNICATION SYSTEM

TECHNICAL FIELD

The present invention relates to a method and an arrangement in a communication system, and in particular to an arrangement allowing for allocating radio resources in a communication network as well as a method for such allocation.

BACKGROUND

CQI or Channel Quality Indicator is used to adapt the rate for a radio link in e.g. High Speed Downlink Packet Access (HSDPA). The user equipment (UE) measures the quality of the radio channel, i.e. a function of SINR and reports that value or a function thereof to the network. The network scheduler may then use this value to adapt the transmission parameters, e.g. modulation order and coding rate so that the UE can decode the data with a given error probability.

When introducing MIMO (multiple input multiple output) transmission/reception capabilities, the link adaptation, and hence CQI reporting may be handled separately between the multiple streams of data transmitted during one transmission time interval (TTI). In this case the UE will measure the CQI per data stream and report this back to the network. The network may then use this information to perform link adaptation of the streams. It has been noted that this kind of separate adaptation is far from optimal. It is also well known that when the channel conditions deteriorate, fewer parallel data streams may be transmitted. This is sometimes referred to as rank adaptation of the transmitted signal.

For example, if two Tx and Rx antennas are used in the system, a maximum of two separate streams may be transmitted. But for situations with e.g. low signal-to-noise ratio (SNR), the channel will only support one transmitted stream. The final decision of how many streams to transmit will be taken by the system scheduler, and this will depend, not only on the instantaneous channel conditions, but also on available system resources, amount of data in the scheduling buffer etc.

Rank selection will heavily influence the CQI estimation. If two streams are expected in the terminal, it will calculate CQI (SINR) per stream taking into account that there is data on the other stream that will interfere. This means that the channel quality that the user has estimated takes into account the interference caused by multi stream transmission. If the scheduler now needs to schedule only one data stream for some reason (lack of resources etc.), it can not perform proper link adaptation because the CQI for single stream transmission is not known, and can not easily be derived by the network.

One solution to this problem is that the UE will not only report CQI for multi stream transmission, but also for single stream transmission. That is, the UE reports the quality as if a single stream is scheduled and the quality as if multiple streams are scheduled. This is, at least in principle, possible at least if the maximum number of streams are low (e.g. 2). But if a larger amount of streams can be allocated, say for 4, it has to report the quality (per stream) for 4 different cases.

This will increase the uplink (UL) signaling amount and is in practice not possible. There are other solutions as well, the different CQI may be fed back in a time division multiplexing (TDM) fashion, meaning that they are time multiplexed on the UL signaling channel. This has the drawback that the adaptation rate will be slower. The system can not follow the variations in the channel to the same extent.

Similar problems as described above will arise when the system uses Spatial Division Multiple Access (SDMA) to transmit a lower number of streams to several users. Normally, MIMO is envisioned as transmitting several data streams to one user, and thus increase the peak rate. It is also possible to divide the available data streams among several users. In this case, increased system capacity is targeted rather than increased peak rate. When to apply which mode, is up to the scheduler, and in principle such a decision can be taken on TTI by TTI basis.

The problem for the scheduler in this case is that it will schedule, say one stream to each user, but needs a CQI that reflects the interference that will arise due to the multi-user transmission.

SUMMARY

Accordingly, it is an objective with the present invention to provide an improved method in a user equipment of facilitating the allocation of radio resources in a communication network, comprising a communication network node communicating with said user equipment by means of data streams over a radio interface on radio channels.

According to a first aspect of the present invention this objective is achieved through a method for facilitating the allocation of radio resources in a communication network. In the method, a channel quality message is transmitted having a length of a pre-defined number of bits comprising information which is used for comparing an obtained channel quality if a single data stream transmission is selected or if a multi data stream transmission is selected for said communication, whereby said communication network node is arranged to allocate available radio resources based on said channel quality message.

Another objective with the present invention is to provide an improved method in a communication network node of facilitating the allocation of radio resources in a communication network, comprising said communication network node communicating with a user equipment by means of data streams over a radio interface on radio channels.

According to a second aspect of the present invention this other objective is achieved through a method for facilitating the allocation of radio resources in a communication network. In the method, a channel quality message is received having a length of a pre-defined number of bits comprising information which is used for comparing an obtained channel quality if a single data stream transmission is selected or if a multi data stream transmission is selected for said communication. Available radio resources are then allocated based on said channel quality message.

A further objective with the present invention is to provide an improved arrangement in a user equipment of facilitating the allocation of radio resources in a communication network, comprising a communication network node communicating with said user equipment by means of data streams over a radio interface on radio channels.

According to a third aspect of the present invention this further objective is achieved through an arrangement that facilitates the allocation of radio resources in a communication network. The arrangement comprises means for transmitting a channel quality message having a length of a pre-defined number of bits comprising information, which is used for comparing an obtained channel quality if a single data stream transmission is selected, or if a multi data stream transmission is selected for said communication, whereby said communication network node is arranged to allocate available radio resources based on said channel quality message.

A still further objective with the present invention is to provide an improved arrangement in a communication network node of facilitating the allocation of radio resources in a communication network, comprising said communication network node communicating with a user equipment by means of data streams over a radio interface on radio channels.

According to a fourth aspect of the present invention this further objective is achieved through an arrangement that facilitates the allocation of radio resources in a communication network. The arrangement comprises means for receiving a channel quality message having a length of a pre-defined number of bits comprising information which is used for comparing an obtained channel quality if a single data stream transmission is selected or if a multi data stream transmission is selected for said communication, and means for allocating available radio resources based on said channel quality message.

Further embodiments are listed in the dependent claims.

Thanks to the provision of an improved channel quality reporting scheme, the radio base station scheduler may, based on the CQI feedback and the preceding feedback from different users, make an informed decision of whether schedule a single stream, two streams to one user or use SDMA and divide the resources between different users.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION

Figure 1:
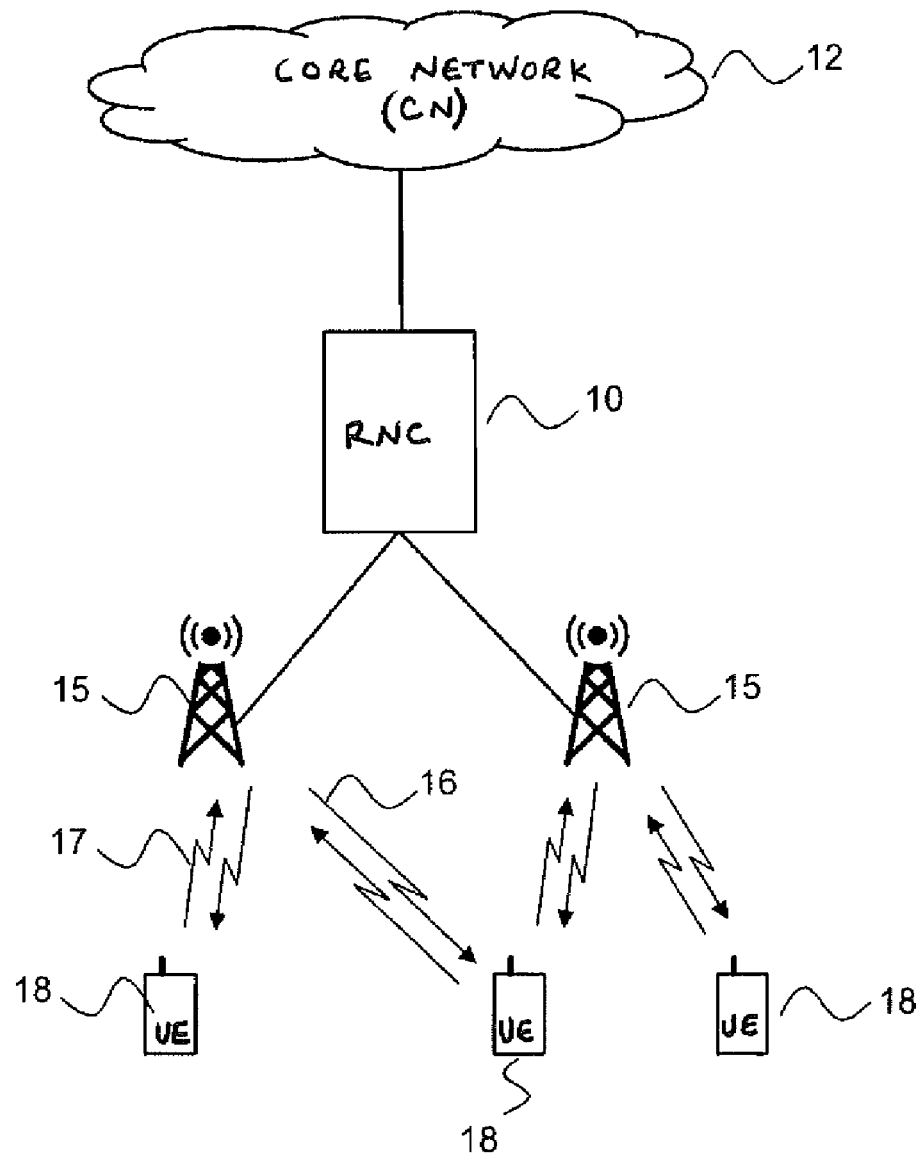
FIG. 1 shows a communication network architecture according to the present invention.

FIG. 1 depicts a communication system including a Radio Access Network (RAN), such as the UMTS Terrestrial Radio Access Network (UTRAN) architecture, comprising at least one Radio Base Station (RBS) (eNode B or Node B) 15 (two are shown in FIG. 1) connected to one or more Radio Network Controllers (RNCs) 10. The RAN is connected to a Core network (CN) 12. The RAN and the CN 12 provide communication and control for a plurality of user equipments (UE) 18 that each uses downlink (DL) channels 16 and uplink (UL) channels 17. For the reason of clarity, only one uplink channel is denoted 17 and one downlink channel denoted 16. On the downlink channel 16, the RBS 15 transmits to each user equipment 18 at respective power levels. On the uplink channel 17, the user equipments 18 transmit data to the RBS 15 at respective power levels.

According to a preferred embodiment of the present invention, the communication system is herein described as a HSDPA communication system. The skilled person, however, realizes that the inventive method and arrangement works very well on other packet based communications systems as well, such as a Long Term Evolution (LTE) system. The user equipments 18 may be mobile stations such as mobile telephones ("cellular" telephones) and laptops with mobile termination and thus can be, for example, portable, pocket, hand-held, computer-included or car-mounted mobile devices which communicate voice and/or data with the RAN.

Here a CQI reporting scheme is disclosed that will alleviate the problems discussed in previous sections. The example given here will be for the MIMO scheme which is part of Rel-7 of the WCDMA specification. It is noted, however, that the CQI reporting scheme disclosed here can be generalized and applied to all MIMO schemes that depend on independent reporting of CQI per stream.

Figure 2:
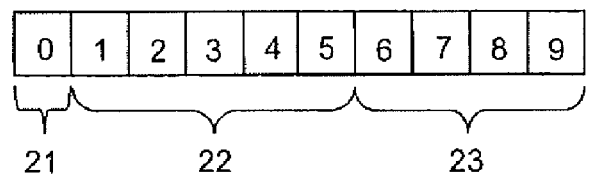
FIG. 2 illustrates the channel quality reporting scheme according to one preferred embodiment of the present invention.

In general, the proposed reporting scheme illustrated in FIG. 2 may be described as follows. A fixed number of bits, ten are shown in FIG. 2, are allocated for CQI. The first bit 21 (or any other of these bits 22, 23) are used for indicating if the remaining nine bits contain CQI for one or two streams. Instead of having one bit indicating the use of the remaining bits, one sequence may indicate one stream transmission and another sequence corresponds to a multi stream transmission. Optionally, the reporting scheme is scrambled in one way for a one stream transmission and scrambled in another way for a multi stream transmission.

If a two stream transmission is indicated, then the first, e.g. five bits 22, correspond to CQI1 while the remaining four bits 23 may describe the difference between CQI1 and CQI2. Alternatively, both CQI1 and CQI2 are sent, e.g. four bits are used for CQI1 and four bits are used for CQI2.

If one stream transmission is indicated, the first five bits 22 are used for CQI1 (as above), and the remaining bits 23 (four in this case) are used to indicate how much worse stream one would be if the radio base station 15 would select a two-stream transmission. This will be the case, for example, if the available streams are divided by different users in SDMA operation.

In the examples above, the multi stream transmission is described as a dual stream transmission. The skilled person, however, realizes that the invention also is applicable on transmissions having more than two data streams.

Figure 3:
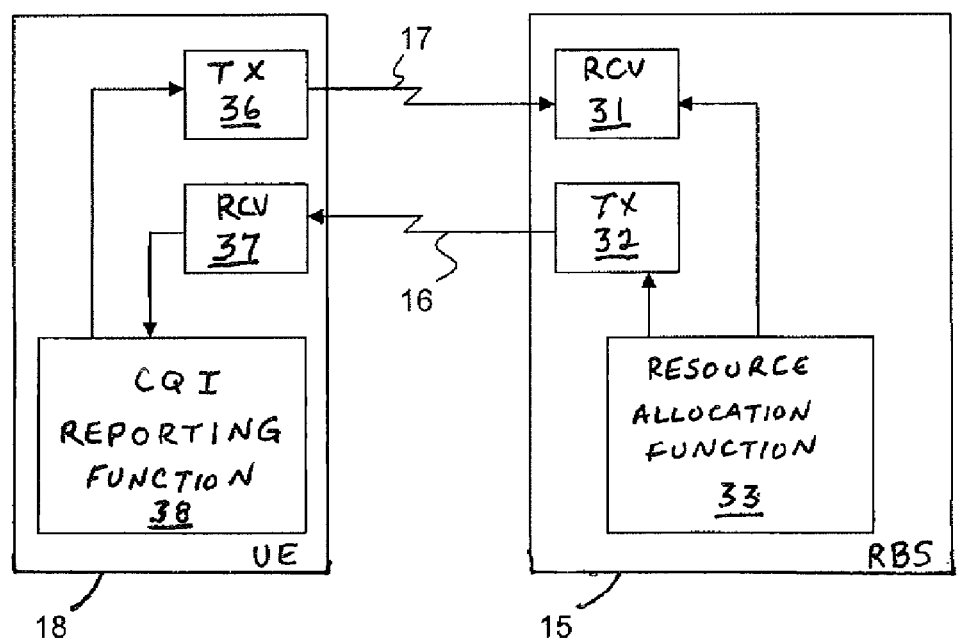
FIG. 3 is a block diagram illustrating a user equipment and a communication network node comprising the arrangement according to the present invention.

FIG. 3 is a block diagram showing the user equipment 18 and the radio base station 15 provided with the inventive arrangements. The user equipment 18 comprises a radio transmitter 36 arranged to transmit data to the receiver 31 of the RBS 15 over the radio interface on the uplink channel 17 and a receiver 37 arranged to receive data transmitted from the transmitter 32 of the RBS 15 on the downlink channel 16. The user equipment 18 further comprises means 38 for providing a channel quality message (the CQI reporting scheme described above) having a length of a pre-defined number of bits comprising information on a channel quality difference between one transmitted data stream and a second data stream, whereby the radio transmitter 36 is arranged to transmit the channel quality message so as to allowing the RBS 15 to make a scheduling decision, i.e. allocating available radio resources based on the received channel quality message.

Figure 4:
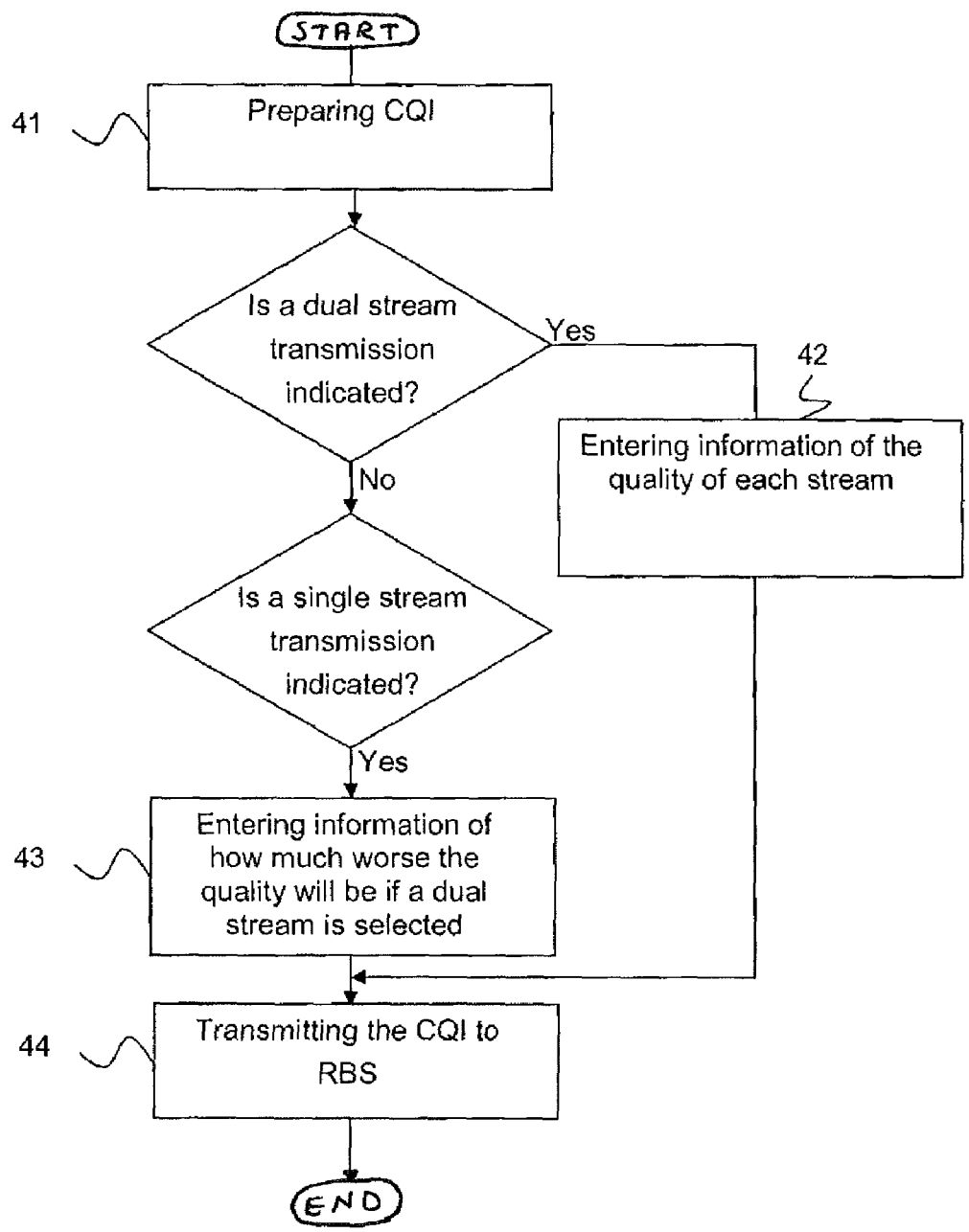
FIG. 4 is a flowchart illustrating the inventive procedure steps in a user equipment.

The RBS 15 comprises a radio transmitter 32 and a receiver 31. The transmitter 32 is transmitting data to a receiver 37 of the user equipment 18 over the radio interface on the downlink channel 16. The receiver 31 is receiving data from the user equipment 18 on the uplink channel 17 and is, thus, arranged to receive the channel quality message transmitted by the user equipment 18. The RBS 15 further comprises means 33 for making a scheduling decision regarding the available radio resources, i.e. FIG. 4 is just an illustrative block diagram showing by example only different functions in a user equipment and a RBS respectively. And, even though the transmitters 32, 36 and receivers 31, 37 are illustrated as single transmitters/receivers they may consist of several transmitter/receiver chains and, thus, transmit/receive the signal over several antenna ports.

Thus, according to a preferred embodiment of the present invention the procedure in the user equipment for facilitating the allocation of radio resources in a communication network, shown in FIG. 4, is as follows:

1) Preparing a CQI report based on measured pilot signals (step 41);
2) If a dual stream transmission is preferred by the UE, entering information of the qualities or the difference in quality between the two streams in the CQI reporting scheme (step 42), as described above the first, e.g. five bits, correspond to CQI1 while the remaining four bits describe the difference between CQI1 and CQI2, or, alternatively five bits, correspond to CQI1 while the remaining four bits correspond to CQI2;
3) If a single stream transmission is indicated by the UE, entering information of how much worse the quality will be if a dual stream is selected by the RBS (step 43), as described above;
4) Transmitting the prepared CQI report to the RBS (step 44), whereby the RBS is allowed to make a scheduling decision based on the CQI reporting scheme.

Figure 5:
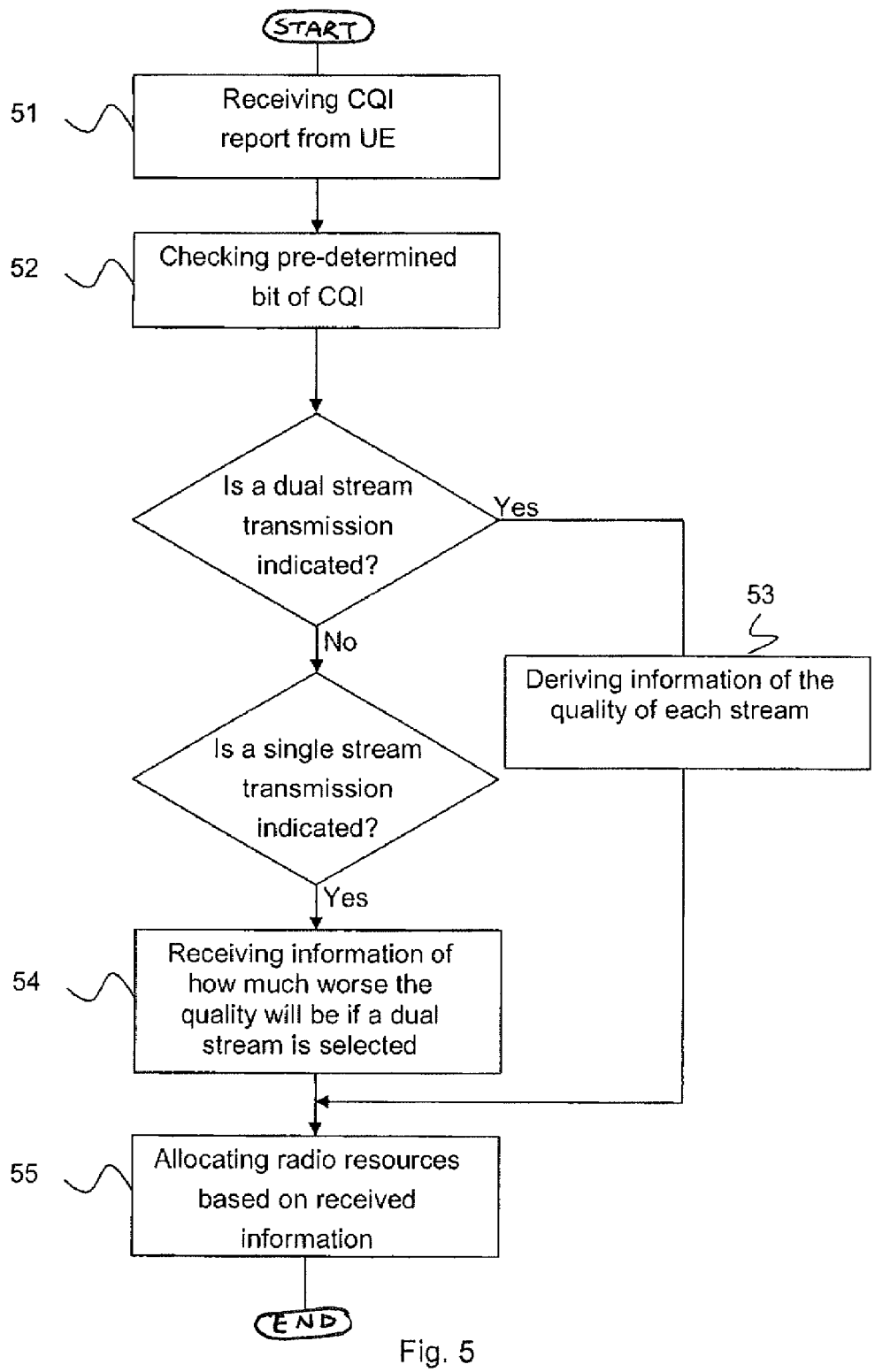
FIG. 5 is a flowchart illustrating the inventive procedure steps in a radio base station.

According to a preferred embodiment of the present invention the procedure in a communication network node, such as a RBS, for facilitating the allocation of radio resources in a communication network, shown in FIG. 5, is as follows:

1) Receiving a CQI report from the UE (step 51);
2) Checking a pre-determined bit of the CQI reporting scheme (step 52) as described above to see if a single or a dual stream is indicated by the UE;
3) If a dual stream is indicated, deriving information of the qualities or the difference in quality between the two streams (step 53), as described above the first, e.g. five bits, correspond to CQI1 while the remaining four bits describe the difference between CQI1 and CQI2, or, alternatively five bits, correspond to CQI1 while the remaining four bits correspond to CQI2;
4) If a single stream transmission is indicated, receiving information of how much worse the quality will be if a dual stream is selected by the RBS (step 54), as described above;
5) Allocating available radio resources based on the received information (step 55), i.e. making a scheduling decision based on the information received in the CQI reporting scheme. The scheduling decision is, however, also based on other gathered information such as available resources in the RBS, quality of service constraints and availability of data for a particular user.

The advantages with the CQI reporting scheme disclosed here are twofold. Firstly, it reduces the need for both single and dual stream CQI. This will then reduce UL signaling overhead or allow for better adjustment to the fast fading (if the alternatives are to feedback CQI for both single and dual stream possibly in a TDM fashion). The second advantage is that this allows for an efficient support of SDMA operation. Note that two stream transmissions may give a very high CQI for one of the streams and a very low for the other, this fact should be utilized in the scheduler by assigning only the good stream to this user, while the other stream is allocated to another user.

In the single stream reporting mode, the last part (the four bits in this example) make it possible for the RBS scheduler to properly decide between single stream transmission and SDMA since they give information about the impact of the interference if the second stream is allocated to another user.

So, regardless of whether the UE reports that it prefers one or two streams, the RBS scheduler may, based on the CQI feedback and the precoding feedback from different users, make an informed decision of whether to schedule a single stream, two streams to one user or use SDMA and divide the resources between different users.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the invention can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method, performed at a user equipment, of facilitating radio resource allocation in a communication network comprising a communication network node communicating with said user equipment via data streams over a radio interface on radio channels, the method comprising:
preparing a channel quality message having a length of a pre-defined number of bits, the channel quality message comprising:
information that a network node in a communication network will use in a comparison to determine an obtained channel quality based on whether the network node selects a single data stream transmission, or a multi data stream transmission, for communicating with the user equipment; and
an indication of how many data streams the user equipment is requesting; and
transmitting the channel quality message to the network node so that the network node can allocate available radio resources based on the channel quality message.

2. The method of claim 1 wherein preparing a channel quality message comprises using one bit of the channel quality message to indicate how many data streams the user equipment is requesting.

3. The method of claim 1 wherein preparing a channel quality message comprises using sequences in the channel quality message to indicate how many data streams said user equipment is requesting.

4. The method of claim 1 wherein preparing a channel quality message comprises scrambling the channel quality message using different techniques to indicate how many data streams said user equipment is requesting.

5. The method of claim 1 wherein preparing a channel quality message comprises including a channel quality indicator to indicate a first data stream if a multi stream transmission is indicated, and including information to indicate a difference between the channel quality of the first data stream and one or more second data streams.

6. The method of claim 1 wherein preparing a channel quality message comprises including a channel quality indicator to indicate a first data stream if a single stream transmission is indicated, and including information indicating how much worse the channel quality will be if the network node selects a multi stream transmission to communicate with the user equipment.

7. The method of claim 1 wherein preparing a channel quality message comprises including a first channel quality indicator in the channel quality message for a first data stream, and including a second channel quality indicator in the channel quality message for at least one second data stream.

8. A method, performed at a network node, of facilitating radio resource allocation in a communication network comprising the network node, wherein the network node communicates with a user equipment via data streams over a radio interface on radio channels, the method comprising:
receiving a channel quality message from a user equipment, the channel quality message having a length of a pre-defined number of bits and comprising:
information that will be used by the network node in a comparison to determine an obtained channel quality based on whether the network node selects a single data stream transmission, or a multi data stream transmission, to communicate with the user equipment; and
an indication of how many data streams the user equipment is requesting; and
allocating available radio resources based on the channel quality message.

9. A user equipment that facilitates radio resource allocation in a communication network having a network node communicating with the user equipment via data streams over a radio interface on radio channels, the user equipment comprising:
a reporting function configured to prepare a channel quality message to have a length of a pre-defined number of bits, and to comprise:
information that a network node in a communication network will use in a comparison to determine an obtained channel quality based on whether the network node selects a single data stream transmission, or a multi data stream transmission, for communicating with the user equipment; and
an indication of how many data streams the user equipment is requesting; and
a transmitter configured to transmit the channel quality message to the network node so that the network node can allocate available radio resources based on the channel quality message.

10. The user equipment of claim 9 wherein the reporting function is configured to include one bit in the channel quality message to indicate how many data streams the user equipment is requesting.

11. The user equipment of claim 9 wherein the reporting function is configured to include sequences in the channel quality message to indicate how many data streams the user equipment is requesting.

12. The user equipment of claim 9 wherein the reporting function is configured to scramble the channel quality message in different ways to indicate how many data streams the user equipment is requesting.

13. The user equipment of claim 9 wherein the reporting function is configured to include a channel quality indicator for a first data stream if a multi stream transmission is indicated, and include information indicating a difference between the channel quality of the first data stream and one or more second data streams.

14. The user equipment of claim 9 wherein the reporting function is configured to include a channel quality indicator for a first data stream if a single stream transmission is indicated, and include information indicating how much worse the channel quality will be if the network node selects a multi stream transmission to communicate with the user equipment.

15. The user equipment of claim 9 wherein the reporting function is configured to include a first channel quality indicator in the channel quality message for a first data stream, and include a second channel quality indicator in the channel quality message for at least one second data stream.

16. A network node for facilitating radio resource allocation in a communication network including the network node, wherein the network node communicates with a user equipment via data streams over a radio interface on radio channels, the network node comprising:

a receiver configured to receive a channel quality message from a user equipment, the channel quality message having a length of a pre-defined number of bits and comprising:

information that will be used by the network node in a comparison to determine an obtained channel quality based on whether the network node selects a single data stream transmission, or a multi data stream transmission, to communicate with the user equipment; and an indication of how many data streams the user equipment is requesting; and a resource allocation function configured to allocate available radio resources based on the channel quality message.

* * * * *